Figure 1:
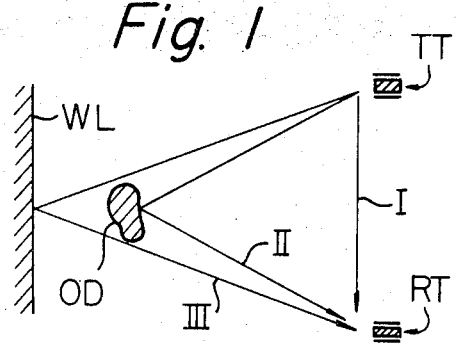

United States Patent
Inoue et al.

[11] 3,781,772
[45] Dec. 25, 1973

[54] ULTRASONIC DETECTION APPARATUS

[75] Inventors: Hiromitsu Inoue, Kyoto; Shinsuke Okamoto, Nishinomiya; Hirokazu Mori, Osaka; Hirosi Ohasi, Neyagawa, all of Japan

[73] Assignee: Matsushita Electric Works, Ltd., Osaka, Japan

[22] Filed: Feb. 25, 1972

[21] Appl. No.: 229,372

[52] U.S. Cl. .................................. 340/1 R
[51] Int. Cl. .............................. G01s 9/66
[58] Field of Search ............ 340/1 R, 3 E, 3 R, 340/3 A; 343/7 PF; 102/70.2 P

[56] References Cited
UNITED STATES PATENTS

| | | | |
|---|---|---|---|
| 3,283,292 | 11/1966 | Kay | 340/3 E |
| 2,823,319 | 2/1958 | Vossberg | 340/3 A |
| 3,178,677 | 4/1965 | Hadley et al. | 340/3 E |

Primary Examiner—Richard A. Farley
Attorney—Wolfe, Hubbard et al.

[57] ABSTRACT

An ultrasonic detection apparatus wherein a receiving transducer for receiving ultrasonic waves transmitted from a transmitting transducer is disposed relatively in proximity to the transmitting transducer. A gate circuit is provided between the receiving transducer and a relay circuit so that only the wave reflected from an object to be detected and reached the receiving transducer will be selectively supplied to the relay circuit.

2 Claims, 5 Drawing Figures

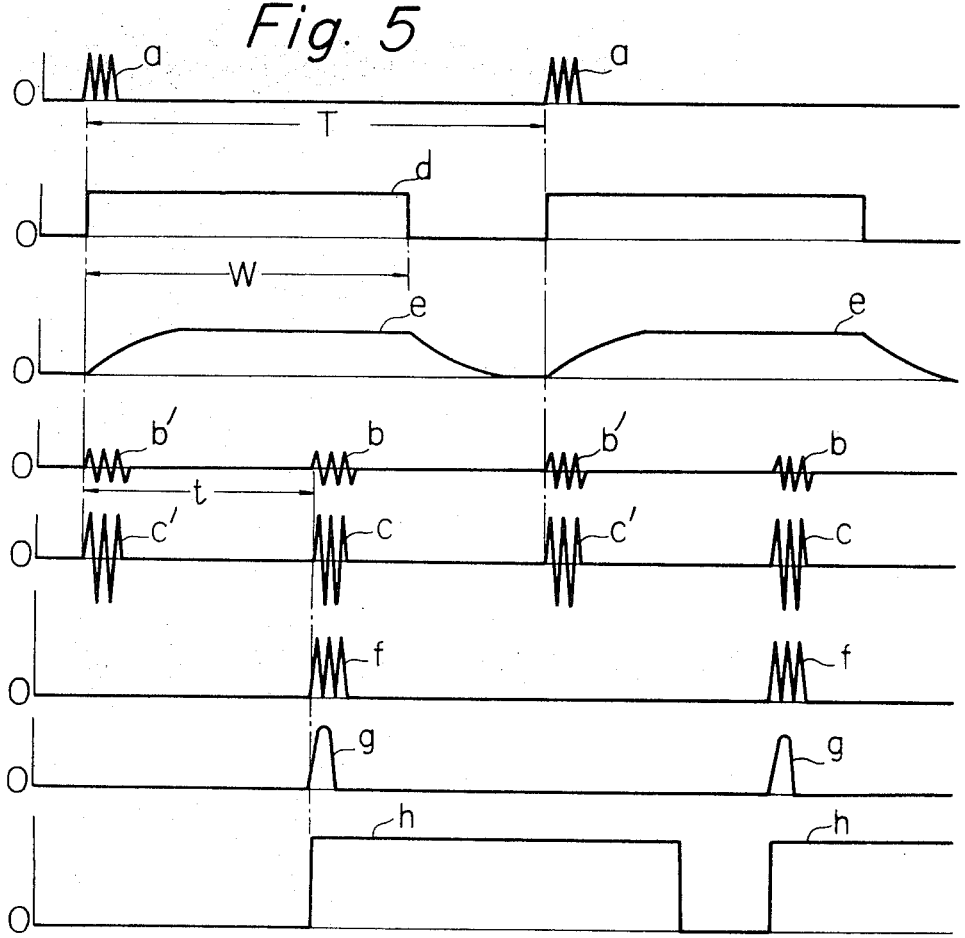
Fig. 5
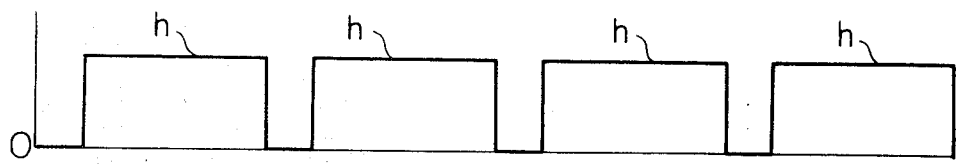
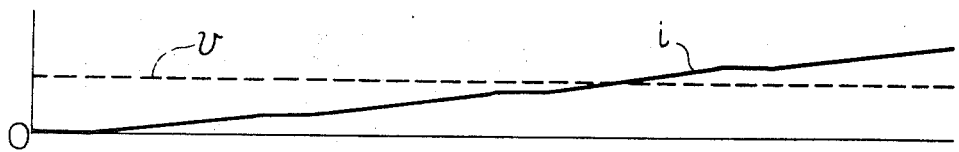

ULTRASONIC DETECTION APPARATUS

This invention relates to ultrasonic datection apparatus and, more particularly, to reflection type ultrasonic detection apparatus.

Generally, the ultrasonic detection apparatus comprises an ultrasonic transmitting transducer and an ultrasonic receiver transducer, and such system that the object to be detected is detected when it comes in between the respective transmitting and receiving transducers is mostly adopted. This type of ultrasonic detection apparatus, though widely in use, has drawbacks in that, for example, the size of the apparatus cannot be made small enough because the transmitting transducer must be located sufficiently away of the receiving transducer.

Whereas the present invention relates to the reflection type ultrasonic detection apparatus utilizing such system that the ultrasonic wave transmitted from the transmitting transducer is reflected from the object to be detected and the reflected wave reaches the receiving transducer whereby the presence of the object is detected, which system not requiring the sufficiently large distance between the transmitting and receiving transducers and hence enabling it possible to reduce the size of the apparatus, the apparatus is defective in that, due to the fact that the ultrasonic wave from the transmitting transducer reaches the receiving transducer through three routes such as the ultrasonic wave reaching the receiving transducer directly, the ultrasonic wave first reaching the object to be detected and then going after reflected therefrom to the receiving transducer, and the ultrasonic wave directed to the walls or structure located remotely behind the object and thence to the receiving transducer, it is unable to avoid possible misaction from occuring because in the detection apparatus merely comprising the transmitting and receiving transducers said three kinds of ultrasonic waves are received without being discriminated specifically. The present invention gives a solution to such misaction problem by disposing a gate circuit between the receiving transducer and the relay circuit and, thus, removing said first and third ultrasonic waves.

In view of the foregoing, a principal object of the present invention is to provide an ultrasonic detection apparatus which is operable without any misaction and is minimized in size.

Figure 2:
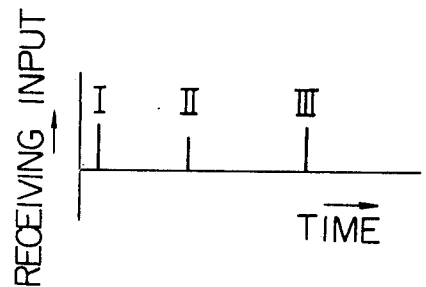
Figure 3:
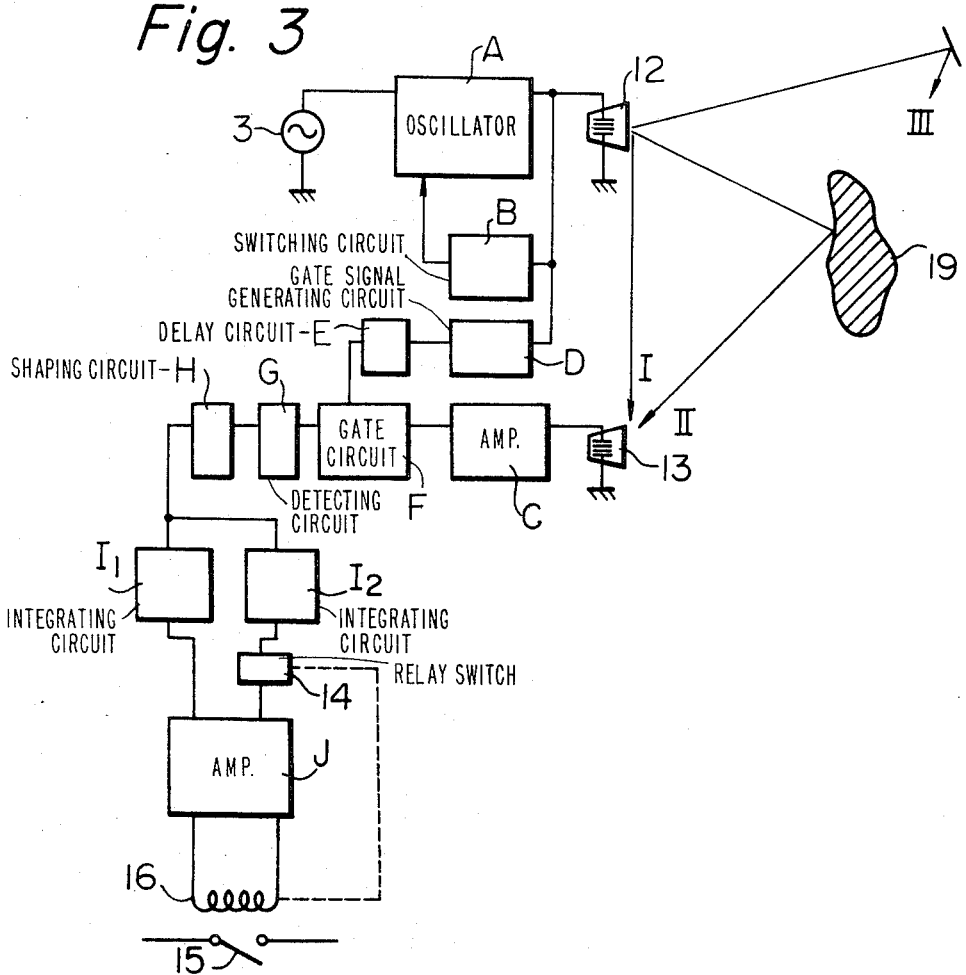
Figure 4:
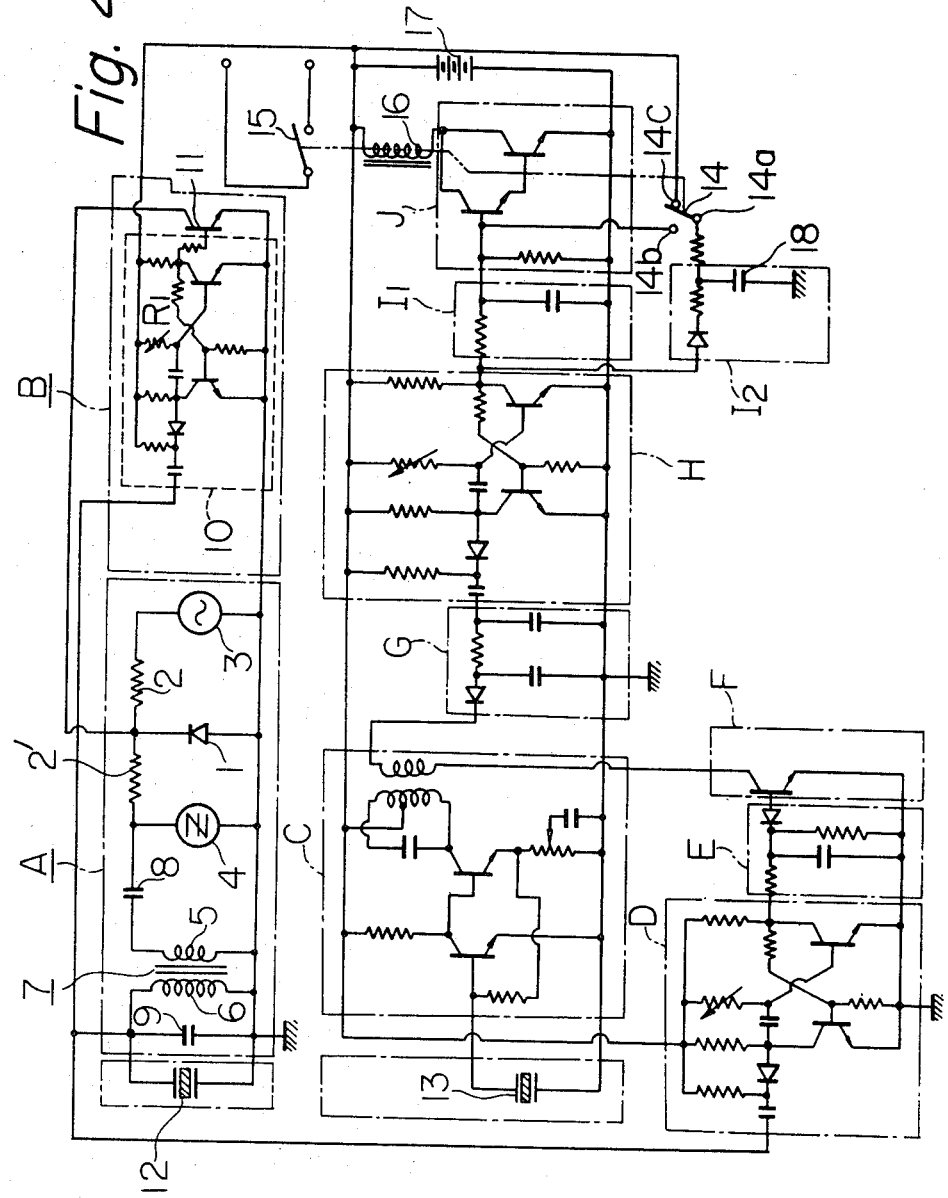

Other objects and advantages will be apparent from the following description detailed with reference to the accompanying drawings, in which:

FIG. 1 is a diagram showing the principle of the reflection type ultrasonic detection apparatus, FIG. 2 is a diagram showing the relationship between the three kinds of reflected ultrasonic waves in FIG. 1 and their propagating times, FIG. 3 is a block diagram showing an ultrasonic detection apparatus embodying this invention, FIG. 4 is a circuit diagram showing an embodiment of this invention, and FIG. 5 shows waveforms in connection with the operation of the apparatus of this invention.

Referring to FIG. 1, there is illustrated the principle of the reflection type ultrasonic detection apparatus, wherein TT is a transmitting transducer, RT is a receiving transducer, OD is an object to be detected, and WL is a wall. The ultrasonic wave transmitted from the transmitting transducer reaches the receiving transducer in three different waves I, II and III. I is the ultrasonic wave reaching directly to the receiving transducer from the transmitting transducer, II is the one reflected from the object OD to be detected, and III is the one reflected from the wall WL. FIG. 2 shows these waves received by the receiving transducer, wherein the abscissa represents the time taken by the respective waves to reach the receiving transducer. As shown, the wave I requires the shortest time, and the wave III the longest time. According to the invention, the waves I and III are removed by using a gate circuit, and only the wave II is amplified to operate the relay FIG. 3 shows the arrangement of an apparatus of this invention, wherein A is an oscillator for generating a pulse output voltage, B is a switching circuit for determining the ultrasonic pulse sending interval, 12 is an ultrasonic transmitting transducer 13 is a receiving transducer, C is an amplifier, D is a circuit for generating a gate pulse having a width smaller than the oscillation interval of pulse output of the oscillator A, E is a delay circuit for delaying the pulse generated by the circuit D, F is a gate circuit responsive to the output voltage of the amplifier C and the output voltage of the delay circuit E, G is a detecting circuit for detecting the output of the gate circuit F, H is a shaping circuit, and $I_1$ and $I_2$ are integrating circuits for integrating the output of the shaping circuit and thereby operating a switching element. The integrating circuit $I_1$ has a large time constant, and the other circuit $I_2$ has a small time constant. J represents an amplifier, 14 is a relay switch, and 15 and 16 are detection switches, respectively.

Referring to FIG. 4, there is shown an ultrasonic detection circuit embodying this invention. In FIG. 4, A is an oscillator, which comprises a diode 1 connected to an AC power source 3 via a resistor 2, a switching element 4 such as two-terminal thyristor which quickly turns on from the nonconducting state when the voltage applied to the diode 1 exceeds a predetermined value, said element 4 being connected in parallel with the diode 1 through a resistor 2', a pulse transformer 7 comprising a primary winding 5 and a secondary winding 6, said primary winding 5 being connected to the switching element 4 via a capacitor 8, and a capacitor 9 and a transmitting transducer 12 connected in parallel to the secondary winding 6. Said capacitor 8 is charged by the positive half cycle voltage of the AC power source 3 through the resistors 2 and 2'. When the charging voltage across the capacitor 8 exceeds the turnover voltage at which the switching element 4 turns on from nonconducting state, the switching element 4 instantaneously turns on, and the charge stored in the capacitor 8 is discharged through the switching element 4 and the primary winding 5. As a result, a pulse output voltage is produced across the secondary winding 6, the negative half cycle voltage of the AC power source 3 is short-circuited through the resistor 2 by the diode 1 connected to the AC power source 3, the capacitor 8 is not charged, and the switching element 4 is made nonconducting. Therefore, one of pulse output voltage is generated across the secondary winding 6 of the pulse transformer 7 at each positive half cycle of the AC power source 3. The charge stored in the capacitor 8 is discharged in such that the resultant discharging current flows to the primary winding 5 to induce a voltage across the secondary winding 6, whereby an oscillating current flows in the oscillating circuit consisting of the secondary winding 6 of the pulse transformer 7 and the capacitor 9. By this oscillating current, the voltage induced in the primary winding 5 becomes alternately reverse and forward with respect to the charging voltage across the capacitor 8. Consequently, the switching element 4 repeats nonconducting and conducting state, the discharging current from the capacitor 8 flows intermittently, the charged voltage across the capacitor 8 is reduced in steps, and thus the discharge from the capacitor 8 terminates. In this circuit, the inductance of the primary winding 5 and the time constant of the capacitor 8 are sufficiently larger than the inductance of the primary winding 6 and the time constant of the capacitor 9, respectively. The reference B represents a switching circuit which, synchronizing with the pulse output voltage of the oscillator A, shortcircuits the AC power source 3 for a certain time interval after generation of the pulse output voltage from the oscillator A. This switching circuit B comprises a monostable multivibrator 10, and a switching element 11 which becomes conducting in response to the pulse voltage of said monostable multivibrator while the pulse output voltage of the monostable multivibrator is present. Said monostable multivibrator 10 synchronizes with the pulse output voltage of the oscillator A to generate a pulse output voltage. Said switching element 11 is connected in parallel to the diode 1 of the oscillator A. The purpose of the switching circuit B is to keep the oscillator A not to oscillate during the presence of the pulse voltage of the monostable multivibrator 10 after the generation of the pulse output voltage from the oscillator A because the switching element 11 is in conducting state while the pulse voltage of the monostable multivibrator 10 is present as the result that the monostable multivibrator 10 generates a pulse voltage synchronizing with the pulse type output voltage of the oscillator A. The generating interval of the pulse output voltage of the oscillator A can be optionally varied by varying the pulse width of the pulse voltage of monostable multivibrator 10, namely, by regulating the value of the resistor $R_1$, and thus the oscillation interval of the pulse output voltage of the oscillator A can be stabilized. 12 is a transmitting transducer, which is capable of converting electric power into an ultrasonic wave. This transmitting transducer 12 comprises, for example, apiezoelectric crystal element and a pair of electrodes properly mounted to the element. When a pulse type output voltage of the oscillator A is applied between said pair of electrodes, the piezoelectric element resonates with the pulse type output voltage, whereby the transmitting transducer 12 transmits an ultrasonic wave. 13 is a receiving transducer, which is capable of converting the ultrasonic wave into an electric power. This transducer 13 comprises, for example, a piezoelectric crystal element and a pair of electrodes properly mounted to the element, in the manner with the transmitting transducer 12. When an ultrasonic wave comes in, the piezoelectric element is resonated, and a high frequency voltage whose frequency is substantially the same as that of the ultrasonic wave is produced across said pair of the electrodes. The receiving transducer 13 is so disposed that the ultrasonic wave from the transmitting transducer 12 is reflected from an object 19 (FIG. 3) to be detected and is then propagated to the receiving transducer 13. C is an amplifier for amplifying the output voltage of the receiving transducer 13, and D is a gate signal circuit comprising a monostable multivibrator, which synchronzies with the output voltage of the oscillator A and generates a gate pulse voltage whose pulse width is smaller than the oscillation interval of the pulse output voltage of the oscillator A. E is a delay circuit for delaying the gate pulse voltage from the gate signal circuit D, and F is a gate circuit driven by the output voltages from the amplifier C and delay circuit D. The output voltage of the amplifier C is supplied to output terminals of the gate circuit F only when the output voltages of the amplifier C and delay circuit F are present simultaneously. G is a detecting circuit for detecting output voltage of the gate circuit F, H is a shaping circuit comprising a monostable multivibrator to be operated in response to output voltage of the detecting circuit G and thereby generating a pulse voltage, and $I_1$ and $I_2$ are CR integrating circuits for a integrating the output voltage of the shaping circuit H. The circuit $I_1$ has a larger time constant and the other circuit $I_2$ has a smaller time constant. J is an amplifier for amplifying output voltages of the integrating circuits $I_1$ and $I_2$. Output voltage of the amplifier J is supplied to relay coil 16 which drives relay switch 14 and detecting switch 15. The output terminal of the integrating circuit $I_1$ is connected directly to the input terminal of the amplifier J, and the output terminal of the integrating circuit $I_2$ is connected to the input terminal of the amplifier J through a common contact 14a and a normally opened contact 14b of the relay switch 14. The output terminal of the integrating circuit $I_2$ is connected through the common contact 14a and a normally closed contact 14c of the relay switch 14 to a DC source 17 from which an energizing power is supplied to the switching circuit B, amplifier C, gate signal circuit D, and shaping circuit H.

This ultrasonic detection apparatus is operated in the following manner.

In FIG. 5, when a pulse type output voltage a is intermittently generated from the oscillator A, the transmitting transducer 12 converts the pulse type output voltage a into an ultrasonic wave, and transmits this ultrasonic wave intermittently. The ultrasonic wave is reflected from such the object 19 as a man to be detected. Assuring that the reflected wave is propagated to the receiving transducer 13 after a time period t from the generation of the pulse type output voltage a, then the receiving transducer 13 generates an output voltage b after the time period t from the generation of the output voltage a of the oscillator A. The output voltage b of the receiving transducer 13 is amplified by the amplifier C, and an output voltage c is produced by the amplifier C. Synchronizing with the pulse type output voltage a of the oscillator A, the gate signal circuit D generates a gate pulse voltage d having a pulse width smaller than the oscillation interval T of the pulse type output voltage a of the oscillator A. The gate pulse voltage d is delayed by the delay circuit E, and an output voltage e is produced by the delay circuit E. The output voltage c of the amplifier C and also the output voltage e of the delay circuit E are applied simultaneously to the gate circuit F. The output voltage c pf the amplifier C is transmitted to the output terminals of the gate circuit F, and the output voltage f of the gate circuit F is detected by the detecting circuit G, whereby an output voltage g is produced at the detecting circuit G. Synchronizing with the output voltage of the detecting circuit G, the shaping circuit H generates a pulse voltage h. This pulse voltage is generated at each time when the ultrasonic wave transmitted from the transmitting transducer 12 is reflected from the object to be detected and propagated to the receiving transducer 13. In this state, the pulse voltage $h$ of the shaping circuit H is integrated by the integrating circuit $I_1$. When a plurality of pulses of the voltage $h$ of the shaping circuit H is integrated by the CR integrating circuit $I_1$, an output voltage $i$ of the integrating circuit $I_1$ exceeds a voltage $v$ which is required for having a current flown to the relay coil 16 which supplied the output power of the amplifier J amplifying the output voltage $i$, which current being sufficient for the relay coil 16 to actuate the relay switch 14 and detecting switch 15, so that the switches 14 and 15 will be switched. When the relay switch 14 is operated, the output terminal of the CR integrating circuit $I_2$ of which time constant is smaller than that of the CR integrating circuit $I_1$ is connected across the input terminals of the amplifier J through the common contact 14a and normally opened contact 14b of the relay switch 14. In this state, since the capacitor 18 of the CR integrating circuit $I_2$ is charged from the DC source 17 before the relay switch 14 makes switching operation, the voltage from the integrating circuit $I_2$ is applied to the capacitor 18. As a result, the input voltage to the amplifier J is further increased, and the output power supplied from the amplifier J to the relay coil 16 is accordingly increased. Thus the reliability of switching operation of the relay switch 14 and detecting swtich 15 is increased.

According to the present invention, the pulse voltage $d$ of the gate signal circuit D synchronizing with the pulse type output voltage $a$ of the oscillator A is delayed by the delay circuit E and then is applied to the gate circuit F. Therefore, when the transmitting transducer 12 is located in proximity to the receiving transducer 13, the pulse voltage $d$ is propagated directly to the receiving transducer 13 from the transmitting transducer 12, and the output voltage $b'$ produced thereby in the receiving transducer 13 is amplified by the amplifier C. The resultant output voltage $c'$ of the amplifier C is applied to the gate circuit F prior to the arrival of the output voltage $e$ at the gate circuit F from the delay circuit E. This is why the output voltage $c'$ which is produced when the ultrasonic wave is propagated directly to the receiving transducer 13 from the transmitting transducer 12 is never propagated to the output terminal of the gate circuit F. Thus it becomes possible to make the detecting switch inoperative.

Further according to the present invention, the capacitor 8 of the oscillator A is charged up to the turnover voltage of the switching element 4 by the positive half cycle voltage of the AC power source 3 through the resistors 2 and 5. Then the switching element 4 turns on from the nonconducting state, and the charged voltage across the capacitor 8 is discharged. THe discharging current from the capacitor 8 flows intermittently. The interval of the intermittently flowing current from the capacitor 8 is made to synchronize with the resonant oscillation of the transmitting transducer 12, so that the transmitting transducer 12 will be caused to powerfully transmit an ultrasonic wave therefrom.

We claim:

1. An ultrasonic detection apparatus comprising an ultrasonic oscillator for generating a pulse type output voltage, a transmitting transducer for generating an ultrasonic wave by the output of said ultrasonic oscillator, a receiving transducer for receiving said ultrasonic wave from said transmitting transducer and converting the ultrasonic wave into an electrical signal as an output, an amplifier for amplifying said output of said receiving transducer, a switching circuit synchronized with said pulse type output voltage from the oscillator and shortcircuiting AC power supplied to said ultrasonic oscillator for a predetermined time interval after said pulse type output voltage is generated, a gate signal generating circuit for generating a pulse having a width smaller than the oscillation interval of the pulse type output voltage of the oscillator, a delay circuit for delaying said pulse from the gate signal generating circuit, a gate circuit for gating the output from said amplifier in response to the output from said gate circuit, a first integrating circuit for integrating the output from said shaping circuit, a second integrating circuit having a time constant smaller than that of said first integrating circuit and preliminarily charged, and a relay switch actuated when the output from said first integrating circuit reaches a predetermined value, so that when said relay switch is actuated the output from the detecting and shaping circuit will be applied to the second integrating circuit.

2. An ultrasonic detection apparatus as defined in claim 1, in which said ultrasonic oscillator comprises a thyristor to which an alternating source current is applied at both ends, a condenser and a primary winding of a transformer connected in a closed series circuit with said thyristor, an oscillation element connected to both ends of a secondary winding of said transformer, and a diode for short-circuiting negative half cycles of said alternating source current, said switching circuit comprising a monostable multivibrator for shortcircuiting the alternating source current while an output voltage of said multivibrator is present, said multivibrator being driven by a trigger pulse from said oscillator.

* * * * *